United States Patent [19]

Stencel

[11] Patent Number: 4,544,312
[45] Date of Patent: Oct. 1, 1985

[54] PIN AND PROCESS FOR ITS MANUFACTURE

[75] Inventor: Edgar L. Stencel, Huntington Beach, Calif.

[73] Assignee: VSI Corporation, Pasadena, Calif.

[21] Appl. No.: 685,957

[22] Filed: Dec. 24, 1984

Related U.S. Application Data

[63] Continuation of Ser. No. 244,827, Mar. 17, 1981, abandoned, which is a continuation-in-part of Ser. No. 849,756, Nov. 9, 1977, Pat. No. 4,260,005.

[51] Int. Cl.⁴ .................. F16B 39/02; F16B 39/28
[52] U.S. Cl. .......................... 411/3; 411/167; 411/281; 411/361; 411/418; 411/437; 10/10 R; 10/27 R
[58] Field of Search ............ 411/2, 3, 167, 176, 411/273, 281, 361, 416, 418, 437; 72/88, 90, 92; 10/10 R, 152 R, 27 R

[56] References Cited

U.S. PATENT DOCUMENTS

| | | | |
|---|---|---|---|
| 3,472,119 | 10/1969 | Peterson, Jr. | 10/10 R |
| 3,492,908 | 2/1970 | Thurston | 10/10 R |
| 3,530,760 | 9/1970 | Lindstrand | 10/10 R |
| 3,875,780 | 4/1975 | Cochrum | 411/311 |
| 4,260,005 | 4/1981 | Stencel | 411/3 |

FOREIGN PATENT DOCUMENTS 1292780  6/1961  France ................. 10/10 R

Primary Examiner—Gary L. Smith
Assistant Examiner—Neill Wilson
Attorney, Agent, or Firm—Christie, Parker & Hale

[57] ABSTRACT

A threaded pin has flutes along the threads formed by roll-forming threads over a preformed section having either flat sides or dished sides. The major diameter of the threads lies along ridge crests bordering the flutes, and the minor diameter of the threads lies at the base of the flutes. The threads extend along the major diameter in each of the ridge crests for a distance on an order of magnitude of the distance across the mouth of each flute. The preformed section is formed by extrusion. The flutes provide space for material from a threaded collar forced into them to provide a thread lock.

9 Claims, 10 Drawing Figures

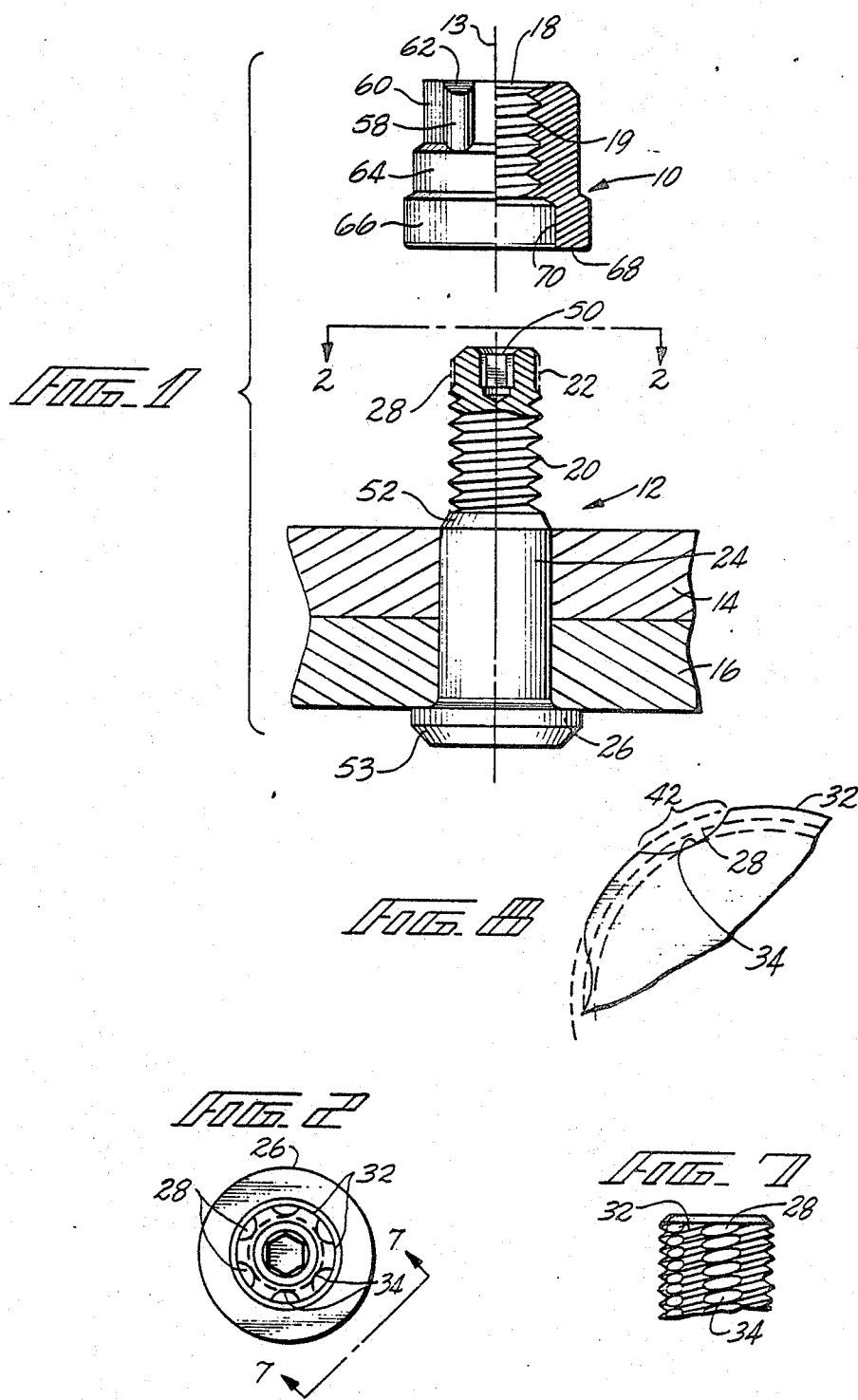

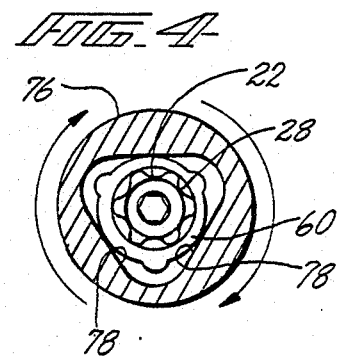
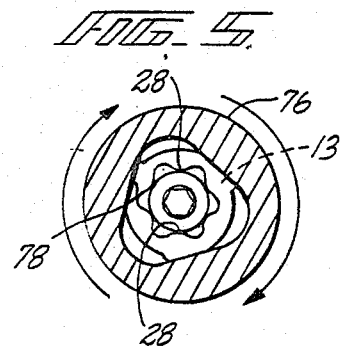
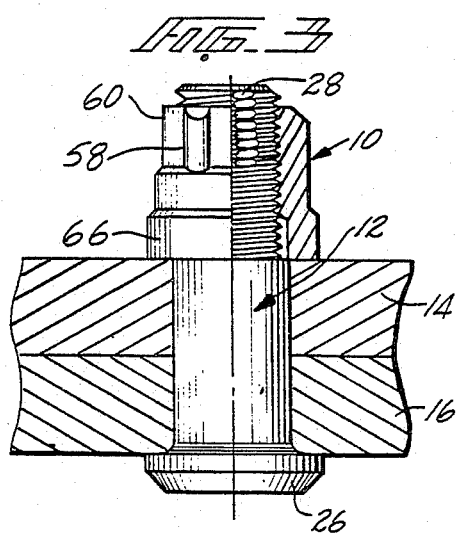
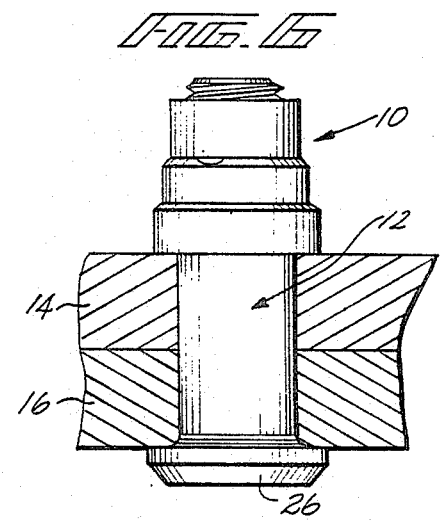
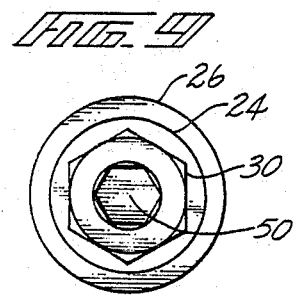
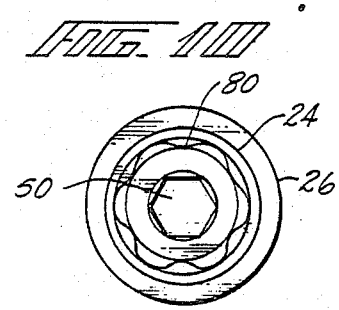

PIN AND PROCESS FOR ITS MANUFACTURE

CROSS-REFERENCE TO RELATED APPLICATIONS

This is a continuation of application Ser. No. 244,827 filed Mar. 17, 1981, now abandoned, which is a continuation-in-part of U.S. application Ser. No. 849,756 filed Nov. 9, 1977 now U.S. Pat. No. 4,260,005.

BACKGROUND OF THE INVENTION

The present invention relates in general to fasteners, and, more in particular, to fasteners that lock when set and that develop a predetermined clamp-up load while being set.

Nut- and bolt-type fasteners go back a long time. They secure workpieces or sheets together by applying a clamp-up force between a head of the bolt and the nut, with this load carried by a threaded engagement between the two. Wrenching surfaces of the nut and bolt accept wrenches that tightly join the fasteners and sheets together. Broadly, another name for a bolt is a "pin" or "shear pin" and another name for a nut is a "collar."

Many environments using fasteners require that the fasteners have extremely high integrity and strength. A fastener must bear loads not only along its longitudinal axis but radially of that axis. When fasteners join two or more sheets together and the sheets are loaded in their planes with different loads, or loads acting in different directions, the sheets tend to slide over each other. Fasteners in the sheets become loaded in shear by their resistance to this type of loading.

Although a fastener may indefinitely sustain constant load, when the load cycles, the possibility of fatigue failure arises. A fastener bearing a high clamp-up load resists fatigue failure better than one with a low load.

An obviously desirable feature of a fastener is that it does not come apart in service. Various devices have been used to keep a collar and pin together. One way of locking a collar and a pin together is to deform the threads of the collar so that they bear in radial compression against the threads of the pin. With this lock, resistance to unthreading is purely frictional. Threads are commonly deformed at the factory, in preference to the field, but field deformation has also been practiced. With threads deformed at the factory, special coatings to resist corrosion or for lubrication are removed during the threading of the collar onto the pin by the friction of the threads. Thread deformation in the field requires a fastener of special configuration to permit such deformation and an additional installation step.

It is also highly desirable to know just what clamp-up load the fastener applies to a structure. Clamp-up load correlates to the resistance of a collar to further threading onto a pin. As clamp-up force increases, resistance to further threading increases and the torque required to turn the collar increases. This fact has been used in fasteners to develop a predetermined clamp-up load. In one prior art fastener, a wrenching section connects to a collar by a frangible breakneck that breaks upon the application of a predetermined torque corresponding to the desired clamp-up load.

A problem with a fastener having a frangible breakneck is that it generates a waste piece during installation that requires attention in its removal. The existence of the waste piece in some environments would be extremely hazardous, for example, in fuel tanks of aircraft.

The features of a thread lock and a frangible breakneck for clamp-up load control have been combined in one collar. The combination has had its shortcomings. Factory deformed threads of the collar effect the thread lock. As such, the collar does not freely thread onto the pin and resists threading. This makes setting somewhat more difficult and compromises protective and lubricant coatings. Clamp-up load control is through a wrenching section that separates from a threaded section by a frangible breakneck that fails at a predetermined load. This creates an excess piece that must be removed. This type of fastener is also comparatively difficult to make because it requires considerable machining, and therefore the fastener is expensive. For accurate control of clamp-up load, the breakneck must be made to very close dimensional tolerances. Tolerance control is made difficult by machine tool wear and because the breakneck becomes elliptical after the thread-locking feature has been incorporated. Alternate methods of forming the frangible breakneck, such as roll forming, are not available because the part is hollow. The frictional drag between the pin and the collar in a fastener system employing a preexisting deformed thread lock results in a broad range in clamp-up force because the drag varies between large limits and is an important component in the resistance that effects failure of the frangible breakneck. Further, with the frangible section, a circular band of material in the zone of failure is created. Where corrosion control is important, this circular band cannot be protected by corrosion inhibitors at the time of fastener manufacture.

A second approach to a locking system employs a pin having a groove for receipt of deformed collar material. The collar is threaded onto the pin to develop desired clamp-up load, and is then deformed radially inward into the groove so that the deformed collar material is restrained by the walls of the groove and establishes interference. The groove can be made axial or annular. In one type of such a fastener, a collar is threaded onto a pin with one setting tool. A second setting tool radially deforms the collar into threads of the pin to effect the interference lock.

In the parent of this application a unique collar and pin are disclosed. The collar will be described in greater detail subsequently, but for purposes here it has a plurality of lobes spaced along its outer surface. A setting tool applies a compressive, radially inwardly directed load on these lobes and in conjunction with the resistance of sheets fails the lobes in radial compression at a predetermined load. Upon failure, collar material inwardly of the lobes moves into the collar's axial bore and into locking engagement with the pin. The pin has a generally hexagonal configuration in the zone where locking occurs. The flats of the hexagon provide volumes for collar material and interference between the collar and the pin. As a result, when collar material displaces into the volumes confronting the flats, the collar and pin lock together.

It is highly desirable in any fastener that employs a threaded coupling to have a large area of the flanks of the threads in engagement. If with the arrangement just discussed the flats are too extensive, too little flank area will be available for engagement with the threads of the collar.

It is also highly desirable to maintain the minimum radius to the flats at a diameter at least as great as the root diameter of the threads so that the tensile strength of the pin is not affected by the provisions for displaced collar material.

In the disclosed fastener, three lobes cooperate with six flats of the pin to effect a lock. This means, in the usual case, that there will be three zones of collar material displaced into the three volumes contiguous with three flats, the three other volumes being unaffected. Resistance to rotation will be determined by the depth of the flats from a circle of a radius to the edges of each flat. Resistance will also depend on the shape of the flat. If the material in the volumes can readily ramp up the flat to flow into an adjoining void volume, the resistance to unthreading decreases substantially.

SUMMARY OF THE INVENTION

The present invention provides an improved pin for use with a collar that has external lobes capable of deformation to displace collar material into an axial bore of the collar and into interference with a surface of the pin to produce a rotational lock, and a process for the pin's manufacture.

In one form, the pin of the invention has a shank extending longitudinally of a manufactured head. A plurality of flutes extend longitudinally along the shank, with each flute being concave outward in cross section. External, roll-formed threads on the shank cross over the flutes to provide for threaded receipt by the threads of a collar. The depth of the flutes does not exceed the root diameter of the external threads. Means is provided to restrain the pin from rotating while threading the collar onto the pin and developing clamp-up load. The pin is adapted to cooperate with an internally threaded collar that has longitudinally extending lobes on its outer surface. The lobes fail plastically in radial compression upon the application of a predetermined load by a driving tool and a sheet while being threaded onto the pin. With the failure, material inwardly of the lobes plastically displaces into the flutes to establish a locking relationship with the pin by providing material in interference. The predetermined load is applied by sheets acting on the collar and a manufactured head of the pin.

Preferably, the flanks of the flutes are capped by broad ridge crests to define the boundaries of the flute mouths. These crests are formed of radially outwardly displaced shank material from the roll forming. Each crest is at the major diameter of the external threads and extends at the major diameter for a distance on the order of the width of each flute mouth. The bases of the flutes are formed of radially inwardly displaced shank material from the roll forming.

Prior to the formation of the flutes, the shank of the pin may take a preformed configuration. One form has as a cross section a generally regular polygon, say a hexagon, with rounded edges. Alternatively, in cross section the sides of the preform can be slightly dished to present a concave outward curvature. After thread rolling, the curvature in the dished zones is accentuated in the formation of the final flutes to present greater crest length and steeper flute walls.

In terms of process, the present invention contemplates the forming of the shank of the pin where the threads are to be formed into a preform with a plurality of sides. The preform is then transformed by roll-forming threads onto it and, while roll forming the threads, forming a plurality of flutes extending along the shank intermediate the edges of the sides. These flutes have a concave outward curvature, a mouth and a base. The mouth is at the major diameter of the threads and the base is at the minor diameter of the threads.

The pin construction of the present invention provides a pin that has considerably more thread area in engagement with a collar than a pin formed merely by milling flats onto the surface of a threaded pin. In addition, the pin resists cam-out loads because the flanks of the flutes are steeper than the flanks of the flats just described. Roll forming the flutes avoids interruptions in the stress patterns of the fastener which occur by cutting and preserves uninterrupted grain flow. Roll forming also produces the broad crests and steep flute walls characteristic of this invention.

These and other features, aspects and advantages of the present invention will become more apparent from the following description, appended claims and drawings.

BRIEF DESCRIPTION OF THE DRAWINGS

FIG. 1 is an expanded, elevational view of a collar and a shear pin of the present invention, with the collar and the pin being shown partly in half section and the pin being shown in a pair of sheets;

FIG. 2 is a top plan view of the pin of FIG. 1 taken in the plane 2—2 of that Figure;

FIG. 3 is an elevational view of a collar and the pin of the present invention, with the collar being shown partly in half section, and the collar and the pin engaging a pair of sheets between them just prior to the final setting of a joint;

FIG. 4 shows a driver inserted over the collar of the previous Figures for threading onto the threads of the pin, the flutes of the pin being slightly exaggerated;

FIG. 5 shows the collar and shear pin of the previous Figures, as lobes of the collar fail under the force of the driver, and material radially inward of the lobes flows into void volumes defined by flutes of the pin;

FIG. 6 shows the fastener system of FIG. 3 driven, with the lobes smeared into the surface of the collar;

FIG. 7 is a fragmentary view taken in the plane 7—7 of FIG. 2 to show the details of the flutes;

FIG. 8 shows an enlarged fragmentary plan view looking longitudinally down a flute and adjoining ridge crests;

FIG. 9 is an end view looking up the shank of a pin, with the section that will be threaded extruded into a generally regular hexagon with rounded corners; and FIG. 10 illustrates alternate extrusion to that shown in FIG. 9, with the sides of the preform slightly dished to accentuate the steepness of the flutes and the ridge crests formed by the roll-forming process.

DESCRIPTION OF THE PREFERRED EMBODIMENTS

FIG. 1 shows a locking collar 10 and a shear pin 12 which together form a fastening system. The collar and the pin have a common axis 13. A pair of sheets 14 and 16 receive the shear pin. The collar has a bore 18 with internal threads 19. Bore 18 is circular and the threads are not deformed to form a thread lock. The shear pin has male threads 20 at one end of the pin. These threads receive the threads of the locking collar. The threads on the pin are roll-formed over flats 22 on the free end of the pin. The flats may be in a hexagonal pattern as viewed in cross section. (See also FIG. 4.)

The pin has an unthreaded shank portion 24 received in aligned holes in sheets 14 and 16. A manufactured head 26 of the pin bears on an exposed surface of sheet 16 to develop axial clamp-up load on the sheets in cooperation with locking collar 10.

As can be best seen in FIGS. 2, 7 and 8, the end of the pin has six flutes 28 that extend longitudinally and parallel to axis 13 from the free end of the threads towards manufactured head 26. These flutes are formed by roll-forming threads 20 onto a hexagonal preformed tip of pin 12, such as shown in FIG. 9 at 30. With the thread rolling, material of the preform is forced upwardly to form ridge crests 32 between individual of crests 32 and flutes 28. Roll forming also displaces material radially inward to form a base 34 for each of the flutes.

The roll forming, then, accentuates the curvature of the preformed flats to change the curvature from flat to concave outward, moves shank material radially outward to form ridge crests 32, and moves shank material radially inward to form bases 34.

The position of the shank material prior to roll forming is generally along a thread pitch diameter 36, as shown in FIG. 8. The depth of each flute is preferably at about the root diameter of the threads roll-formed over the flutes, as is shown by reference character 38. The flute depth may not reach the root diameter. If the depth of the flute penetrates the root diameter, the fastener's tensile strength is lowered. The major diameter of the threads is at 40.

The span along the major diameter of the threads occupied by ridge crest 32 is on the order of the span across the widest portion of flute 28 which is on the same circle as the ridge crest. This widest portion of the flute is a mouth and is indicated at 42.

The distance that the flutes extend from the free end of the pin towards manufactured head 26 is a function of two things: (1) the amount of material that they will receive from the collar, and (2) the grip range of the system. If the grip range is large, the length of the flutes must be correspondingly large in order to properly index with the material displaced from the collar into them. In preferred form, there are six flutes for three lobes of the collar. Nevertheless, each flute should be able to accept the displaced volume of one lobe.

Returning to FIG. 1, pin 12 has a hexagonal wrenching socket 50 at the free end of the threads. This socket can be formed by broaching. Threads 20 step down from shank 24 at a conical shoulder 52. Head 26 is of major diameter and provides constraint against sheet 16 by bearing compressively on that sheet. The head, as is standard practice, is round and is beveled at 53 at its free edge.

Collar 10 has a plurality of external, purely axially extending ribs or lobes 58 extending radially outward from a generally cylindrical section 60. These lobes are beveled at 62 to provide ease of tool insertion and terminate about midway along the length of the collar at a pilot section 64. This section receives a piloting section of a driver and keeps the driver from canting during insertion or rotation. A stand-off base 66 of the collar joins the pilot section 64 and provides an area of large bearing at its contact surface 68 and for an enlarged counterbore 70.

The surface of the lobes extends purely axially. The radius of curvatures of all the lobes are equal. All the lobes are identical.

The setting of the fasteners is illustrated in FIGS. 3 through 5. Collar 10 is threaded onto pin 12 as by a deltoid socket driver 76. This driver has three flat interior sides 78. These sides approach the center of the driver, which corresponds to axis 13 of the fastener system, at a point of minimum radius that corresponds approximately to the radius of right cylindrical section 60 and the radius at the radial inside base of each of the lobes. During setting, the lobes are engaged by the sides of the driver. Collar 10 threads onto pin 12 to meet sheet 14. At the point reached in FIG. 3, there is insufficient load in the lobes to cause their deformation. But because the collar bears on sheet 14, with the continued rotation of driver 76, the loading applied on the lobes will increase rapidly. As can be seen in FIG. 5, driver sides 78 engage the lobes and produce both radial and tangential components of force on them, these directions being taken with respect to the axis of the fastener system. The radial component of force begins to flatten the lobes and smear them into the body of the collar. Material thus displaced pushes material on the inside of the collar in the void spaces between the collar and pin defined by flutes 28.

After the driver essentially erases the lobes, it is free to turn on the collar and an operator knows that a joint has been effected. At least three of the flutes are now substantially completely filled with displaced collar material and the inside of the collar takes on a configuration mating with the filled flutes. A rotational lock now exists because of interference between collar material and pin material. The collar material has been plastically deformed. The ribs or lobes plastically deform in response to the radial compression produced by the driver and disappear within the few degrees of rotation of the driver that correspond to the angle subtended by each lobe.

Axial clamp-up is a function of the axial load applied by the sheets onto the collar. This loading loads the flanks of the threads between the collar and the pin. As the loads on the flanks increase, so does the frictional resistance to turning. Eventually, resistance to turning exceeds the yield strength of the lobes and the fastener is set by the lobes disappearing into the body of the collar and forming the locking material that flows into the flutes. Accordingly, with the present invention, axial clamp-up load occurs at the same time thread lock occurs, but not before.

With reference again to FIGS. 7 and 8, each flute 28 has a generally concave curvature resulting from the threadrolling process. That process is such that the material of the shank rises out of the area where the flute is being formed and builds ridge crests 32, and the base of the flute is spread circumferentially and radially outward to complement the formation of the ridge crest. The concave curvature of each flute 28 produces a substantially steeper wall than would flats of a corresponding regular geometric figure. In the embodiment illustrated there are six flutes. A corresponding regular geometric figure would be a regular hexagon. The resistance of lobe material displaced into the flutes from coming out of the flutes is a function of the steepness of the walls of the flutes. If the walls are not steep enough, material will cam out and the thread lock will be lost. With a regular hexagon, the ramp is 30°, the angle between the flat and a tangent to the circle at the edge of the flat. With the curvature effected by the roll forming, the angle is substantially greater.

The degree of flute curvature depends on many things, including the pitch of the threads and the hardness of the pin. It also depends on the initial preform configuration over which threads are to be rolled. As previously alluded to by reference to FIGS. 9 and 10, a preform tip might be a regular hexagon such as shown at 30. On the other hand, it may be more of a dish shape, such as shown at FIG. 10 by reference numeral 80. Upon rolling the preform of FIG. 10 with threads, the steepness of the walls of the resulting flutes will be even greater than illustrated in FIG. 8.

Even with the considerable span at the ridge crest, if the lobes should register there when their failure occurs, material will still flow into the flutes, but this time the material might flow to all the flutes, and not just into three.

Returning back to FIG. 1, pin 12 can take any number of configurations. It has been shown with a wrenching recess 50. But other wrenching means can be provided. For example, head 26 can be made wrenchable with wrenching flats or a wrenching recess. The manufactured head can be a recessed type. Further, shank 24 need not have a diameter larger than the major diameter of threads 20. The materials from which pin 12 can be made are considerable. The surface of the pin can be prepared with special coatings, if desired. The pin can have a lubricant coating or a protective coating, such as cadmium.

The invention provides a pin suitable for use with a collar with lock-up lobes. The pin has considerable thread flank area and steep flute walls to trap collar material. The extruded tip and roll-formed threads avoid cutting across stress lines. The minimum diameter of the flutes corresponds to the thread root diameter, and therefore the pin's strength in tension is not affected by the flutes.

The present invention has been described with reference to a certain preferred embodiment. The spirit and scope of the appended claims should not, however, necessarily be limited to the foregoing description.

What is claimed is:

1. In combination, a pin and a collar comprising:
   (a) the collar having:
   an internally threaded axial bore and external, longitudinally extending lobes on its outer surface, the lobes being capable of failing plastically in radial compression upon the application of a predetermined load onto them, the load being effected by a driving tool and at least one reacting sheet while threading the collar onto the pin to plastically displace collar material radially inward into the axial bore and into locking relationship with the pin;
   (b) the pin having:
   (i) a manufactured head at one end of the pin for applying a clamp-up load on the sheet;
   (ii) a shank extending longitudinally from the head to the other end of the pin;
   (iii) a plurality of regularly placed flutes extending longitudinally along the shank from the end of the pin opposite the head and ending at points spaced from the head, each flute being substantially concave outward in cross-section;
   (iv) external roll-formed threads on the shank extending from the end of the pin opposite the head past the ends of the flutes and crossing over the flutes for threaded receipt by the threads of the collar, the depth of the flutes being substantially equal to the root diameter of the external threads in the flutes;
   (v) a ridge crest on each side of the flutes and extending circumferentially at the major diameter of the threads, each of the ridge crests spanning a circumferential distance on the order of the distance across each flute at the major diameter; and
   (vi) means to restrain the pin from rotating while threading the collar onto the pin and developing the predetermined load;
   whereby, displaced collar material flows into the flutes to lock the collar to the pin upon application of the predetermined load onto the lobes.

2. The combination claimed in claim 1 wherein the shank has a preformed section with a plurality of sides, each flute having a corresponding one of the sides and being formed on its side.

3. The combination claimed in claim 2 wherein the sides of the preform are a regular polygon, the corners of the polygon being rounded.

4. The combination claimed in claim 3 wherein the polygon is hexagon.

5. The combination claimed in claim 4 wherein the sides are dished with a concave curvature prior to formation of the flutes.

6. A combination of an improved pin and a collar for use with the pin comprising:
   (a) the collar having an internally threaded axial bore and a plurality of plastically deformable lobes on the outer surface of the collar that fail in radial compression upon the application of a load onto them by a driver and a sheet that corresponds to a predetermined clamp-up load on the sheet, and, with the failure, material of the lobes forces collar material ahead of it into the axial bore of the collar to lock the collar and the pin together;
   (b) the pin having:
   (i) a manufactured head at one end of the pin for applying a clamp-up load onto the sheet;
   (ii) a shank extending longitudinally from the head to the other end of the pin;
   (iii) a plurality of flutes extending longitudinally along the shank to end points spaced from the head, each flute having a substantially concave outward curvature, a mouth and a base;
   (iv) roll-formed external threads on the shank and flutes for engaging the threads of the collar, the threads extending past the end points of the flutes;
   (v) ridge crests defining the boundaries of the mouths of the flutes, the ridge crests being formed of radially outwardly displaced shank material from the roll forming, each crest being at the major diameter of this external thread and extending at the major diameter for a distance of on the order of the width of each flute mouth;
   (vi) the base of the flutes being formed of radially inwardly displaced shank material from the roll forming and having a diameter substantially equal to the minor diameter of the threads; and
   (vii) wrenching means to restrain the pin from rotation during threading of the collar onto the pin and the development of the predetermined load;
   whereby displaced collar material flows into the flutes to lock the collar to the pin upon application of the predetermined load onto the lobes, the flanks of the threads in the crest carry considerable load, and the displaced collar material in the flutes is positively retained there by the concavely curved walls of the flutes.

7. The combination claimed in claim 6 wherein each of the flutes is on an associated side formed from a preformed section of the flank, the preformed section having the general shape of a polygon.

8. The combination claimed in claim 7 wherein each side of the preform prior to flute formation is dished.

9. The combination claimed in claim 8 wherein the preform is a regular hexagon with rounded corners.

* * * * *